United States Patent [19]

Worcester et al.

[11] 3,786,633
[45] Jan. 22, 1974

[54] PROPELLANT IMMOBILIZER AND RESONANCE SUPPRESSION SYSTEM

[75] Inventors: Francis J. Worcester, La Plata, Md.; William H. Ailor, III, West Lafayette, Ind.

[73] Assignee: The United States of America as represented by the Secretary of the Navy, Washington, D.C.

[22] Filed: Jan. 26, 1973

[21] Appl. No.: 327,046

[52] U.S. Cl. .................................. 60/255, 60/256
[51] Int. Cl. ............................................. F02k 9/06
[58] Field of Search .. 60/255, 256, 39.47, 253, 254; 102/49.3–49.8, 102

[56] References Cited
UNITED STATES PATENTS

| | | | |
|---|---|---|---|
| 3,000,305 | 9/1961 | Schmidt et al. | 60/255 X |
| 3,144,829 | 8/1964 | Fox | 60/255 X |
| 3,173,253 | 3/1965 | Elias | 60/255 |

Primary Examiner—Carlton R. Croyle
Assistant Examiner—Robert E. Garrett
Attorney, Agent, or Firm—R. S. Sciascia; J. A. Cooke; F. K. Yee

[57] ABSTRACT

A system for immobilizing solid propellant grain while providing an improved mechanical suppression of resonant burning comprises a small diameter, tension spring extending within the center bore of the grain. The spring is fastened at the forward end to a spacer abutting the grain while the other end is fastened to a resonator rod positioned within the center bore. An immobilizing force is thus exerted upon the grain which does not appreciably vary with ambient temperature changes. The spring is free to oscillate in the longitudinal and transverse modes thus serving more effectively as a mechanical resonance suppressor.

14 Claims, 3 Drawing Figures

PROPELLANT IMMOBILIZER AND RESONANCE SUPPRESSION SYSTEM

BACKGROUND OF THE INVENTION

The present invention relates to rocket motors and more particularly to resilient means to immobilize the solid propellant grains within the motor against movement and to provide suppression of resonant burning.

Presently used propellant grain immobilizers predominantly consist of a relatively short-length spring compressed between the end of the grain and some structure of the rocket motor, such as a bulkhead. A single spring of a diameter substantially equal to the internal diameter of the rocket motor may be used. Alternatively, a plurality of small-diameter compression springs spaced circumferentially against the propellant grain may be employed. Generally the immobilizer springs are positioned against the forward end of the rocket motor. Some immobilizer systems have incorporated a viscous fluid damping means with compression spring or springs.

Due to its relatively short length, compression type immobilizer springs exert a wide range of restraining force as ambient temperature varies. At very low temperatures, when the propellant grain experiences maximum thermal contraction, the immobilizer springs may not be exerting any force at all, permitting the brittle grain of the unrestrained propellant to be easily cracked or otherwise damaged by shocked loads sustained by the rocket motor. At the other extreme of operating temperatures, when the grain experience maximum thermal expansion and is most susceptible to plastic flow, the immobilizer spring is fully compressed. Thus exerting maximum restraining force, again possibly causing structural damage to the propellant. These variable extremes of immobilizing force may be corrected by using longer compression springs. However, such springs require greater volume within the rocket thus reducing the volume available for propellant. Reduced propellant volume is generally not acceptable and any compensating increase in rocket size is usually prohibited by other systems design constraints.

Resonance rods, which are generally slim, steel rods extending into the central propellant grain perforation, are used in many rocket motors to control resonant combustion shock waves. These rods may be coated with a plastic salt compound to control exhaust afterburning and to further reduce combustion instability. The resonance rod, generally positioned at its forward end against some part of the rocket motor structure, is free to vibrate as a cantilever beam but cannot oscillate in the longitudinal direction.

SUMMARY OF THE INVENTION

Accordingly, one object of the present invention is to provide a new and improved propellant immobilizer and resonance suppression system.

Another object of the invention is the provision of a new and improved propellant immobilizer and resonance suppression system which will provide a substantially constant immobilizing force over extremes of operating temperatures.

Another object of the present invention is the provision of a new and improved propellant immobilizer and a resonance suppression system which is effective at all operating temperatures.

Yet another object of the instant invention is to provide a propellant immobilizer system which is compact and will permit increased propellant load but will not alter the rocket motor external configuration.

A further object of the invention is the provision of a more effective combustion resonance suppression system.

Briefly, in accordance with one embodiment of this invention, these and other objects are attained by providing in a solid propellant rocket motor a small diameter, relatively long lenth, tension spring extending within the central bore of the propellant grain. The forward end of the spring is secured to a spacer abutting the grain while the other end is attached to a resonator rod. Dimensional changes in the grain length due to temperature variations will result in only small percentage changes in the spring relative to its total extended length. Thus the spring immobilizing force will be substantially constant for the range of operating temperatures. At the same time the spring will be free to oscillate in the longitudinal and transverse modes, thus serving as a more effective mechanical combustion resonance suppressor.

BRIEF DESCRIPTION OF THE DRAWING

A more complete appreciation of the invention and many of the attendant advantages thereof will be readily appreciated as the same becomes better understood by reference to the following detailed description when considered in connection with the accompanying drawings wherein.

DESCRIPTION OF THE PREFERRED EMBODIMENT

Figure 1:
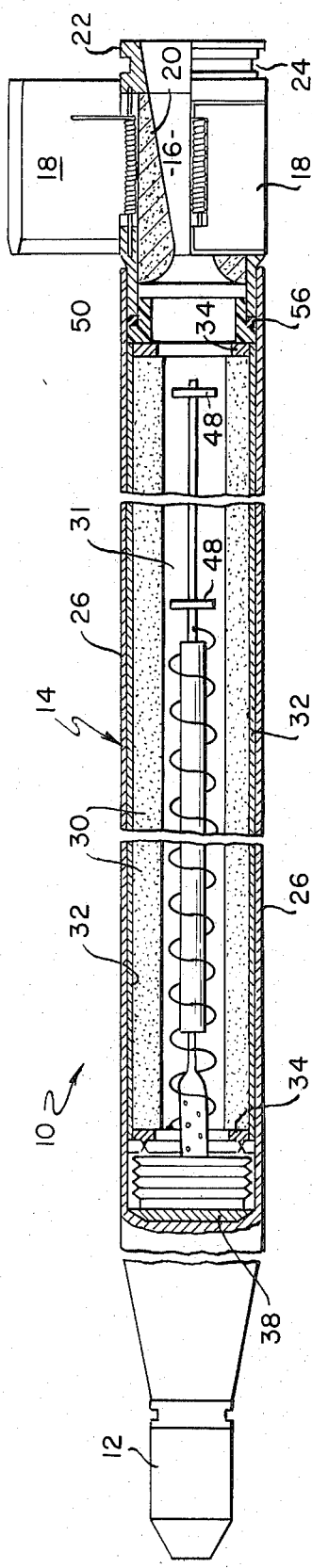
FIG. 1 is an elevational view, partly in section, of a rocket vehicle embodying the present invention.

Referring now to the drawings wherein like reference characters designate identical or corresponding parts throughout the several views and more particularly to FIG. 1 thereof, a solid propellant rocket engine or motor is shown embodied in an aerial vehicle 10. By way of illustration only, vehicle 10 is shown to be a rocket having a warhead 12, rocket motor 14, aft nozzle 16 and fins 18. Warhead 12 is of the type known and used in the art and is suitably secured to the forward end of the rocket motor, as by a threaded connection. Similarly, nozzle 16 with throat liner or insert 20 of any suitable material, such as graphite, is known and used in the art. Fins 18 are shown to be of the collapsible type, with the upper fin shown in FIG. 1 in the open, extended position and the lower fin in the closed position. Collapsible fins are advantageously used with tubular-type rocket launchers, but obviously, other fin configurations are possible and within the scope of the present invention.

Positioned aft of exhaust nozzle 16 and integrally formed therewith is the rear bourrelet assembly 22 with suitably configured grooves 24 permitting attachment of rocket 10 to a suitable launcher. The exhaust nozzle 16 with inserts 20, fins 18 and bourrelet assembly 22 are fitted as a single unit to the aft end of rocket motor 14 by suitable means, such as lock rings or lock wires.

Figure 2:
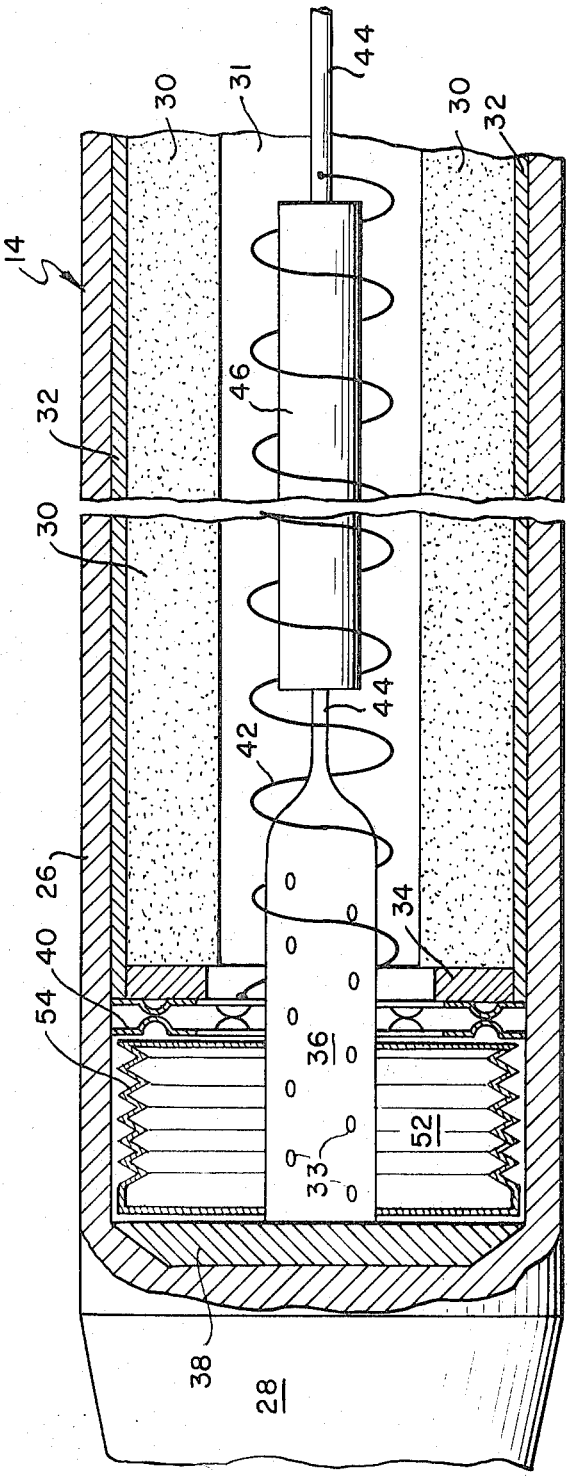
FIG. 2 is an enlarged scale, sectional view of the forward portion of the rocket motor showing the invention in greater detail.

Looking more closely now at rocket motor 14 and with particular reference to FIGS. 1 and 2, the rocket motor comprises an elongated, tubular casing 26, which may be extruded from aluminum, having an intergrally-formed bulkhead 28 closing off the forward end of the casing. The aft end of casing 26 is open to receive the propellant grain cartridge, nozzle and fin assembly. A cyclindrical cartridge of solid propellant grain 30 is adapted to be inserted into casing 26 from the open, aft end. Propellant grain 30 has the usual, center perforation or bore 31 for combustion and is surrounded on the exterior surface by peripheral inhibitor 32 and on the ends by end inhibitors 34. End inhibitors 34 have central apertures of a diameter somewhat larger than the central grain perforation 31 to permit insertion of the ignitor at the forward end and exit of the exhaust gases from the aft end. The total propellant cartridge with the peripheral inhibitor is of a smaller diameter than the inner diameter of casing 26 so that under normal temperature conditions there is an annular space surrounding grain 30 which is not shown in the drawings. This annular space permits lateral expansion of the propellant grain at high temperatures. The material of the propellant grain, method of fabrication, the material and method of applying the end and peripheral inhibitors are well known and used in the art and hence need not be considered further in the present discussion.

Referring now to FIG. 2, an elongated, cylindrical ignitor 36 is attached to a flat, circular disc 38 suitably seized and adapted to fit with casing 26, abutting against bulkhead 28. With disc 38 positioned against the bulkhead, ignitor 36 is adapted to extend into central perforation 31 of the propellant grain. The body of igniter 36 is provided with a plurality of ports 33 distributed over the entire outer surface to permit initiation of propellant combustion. A spacer 40, comprising a pair of annular rings stamped from steel sheet material and suitably joined, such as by a plurality of spot welds spaced along the circumference, abuts the foward end of grain 30 to permit equalization of pressure between perforation 31 and the annular space surrounding the propellant grain. Attached to the aft end of igniter 36, as by a threaded connection or by welding, resonance rod 44 extends down into perforation 31. A plurality of felt discs 48 spaced along the length of rod 44 prevent the rod from striking and possibly damaging the propellant grain. These discs are blown out the exhaust nozzle upon ignition of motor 14. A portion of rod 44 may be coated with a plastic salt compound 46 to control exhaust after burning and further reduce combustion instability. The plastic salt compound and the use thereof with a resonance rod is covered more fully in U.S. Pat. No. 3,068,643.

A small diameter, tension spring 42 is positioned around rod 44, one end being suitably attached to spacer 40 with the other end suitably attached to rod 44 at a point beyond salt coating 46. The unloaded, unextended spring length will be dependent upon the type of propellant grain, the anticipated range of operating temperatures to which vehicle 10 will be subjected and the desired immobilizing force to be exerted upon grain 30. By way of example only, spring 42 may have an unloaded length of 4 to 6 inches with resonance rod 44 extending approximately 12 to 14 inches into perforation 31. When assembled, grain 28 will tend to push forwardly against spacer 40 with rod 44 extending aft toward the exhaust nozzle. Thusly configured, spring 42, being secured at its ends to spacer 40 and rod 44 will be placed in tension and with the above-mentioned dimensions will exert a nominal thirty pounds of force against the grain. Since the changes in grain length are of the order of an inch or less over the complete temperature range, spring 42 will be contracting and extending over only 10 percent of its length thereby maintaining a nearly constant immobilizing force under all ambient temperature conditions.

In order to allow for expansion of grain 30, a space 52 is provided forward of the grain and aft of bulkhead 28. Since spacer 40 is essentially an open structure and forward end inhibitor 34 is centrally perforated, hot combustion gases would issue forwardly, creating an excessive temperature environment for that portion of casing 26 surrounding space 52. To protect this portion of the casing, a flexible, bellows-type sleeve 54, centrally perforated to encircle igniter 36, is inserted between disc 38 and spacer 40 to effectively enclose space 52. Sleeve 54 may be fabricated from any suitable material, such as plastic, and the bellows pleated walls permit contraction and expansion as the propellant grain expands and contracts. To insure the contraction and expansion of sleeve 54, the aft surface of the sleeve may be adhesively attached to spacer 40 or the sleeve may be fabricated with spring wires embodded within the bellows pleats. The central perforation of sleeve 54 is suitably flared (not shown) to provide gas seals against the body of igniter 36.

Resonance rod 44, attached to igniter 36 and extending into central perforation 31 oscillates as a fixed, cantilever rod, i.e., it vibrates in modes normal to the longitudinal axis. Ignition and combustion shock waves generated by the burning of propellant grain 30 are broken up by rod 44, thereby precluding formation of resonant shock waves. Rod 44 is unable to oscillate longitudinally but with spring 42 attached as set forth hereinabove, the rod and spring combination will more effectively serve to suppress resonant vibration than rod 44 alone since in its partially stressed, elongated condition spring 42 will be free to oscillate in a longitudinal, wave-like mode or even a spiral mode in addition to the transverse mode.

In assemblying the rocket motor 14 of FIGS. 1 and 2, bellows sleeve 54 is positioned against disc 38 to which igniter 36 and rod 44 have been attached. Spacer 40 is then positioned against sleeve 54 and spring 42 is attached to spacer 40 and rod 44. These elements thusly assembled are placed within the grain central perforation and propellant grain cartridge 30 is then inserted into casing 26 so that the forward end abuts bulkhead 28. End sleeve 50 has been previously adhesively attached to the grain cartridge and annular seal ring 56 placed thereon. The fin, nozzle and bourrelet assembly is next inserted into casing 26 and attached thereto by suitable means. Warhead 12 is then secured to the rocket motor and the entire rocket is placed within the launcher with groove 24 engaging suitable locking or detent means on the launcher. The necessary electrical and safety connections are then made to complete assembly of rocket 10 and place it in condition for use.

The igniter can be positioned within the casing otherwise than by means of a disc. For example, the forward end of the igniter can be provided with a threaded extension adapted either to be screwed into a threaded bore in bulkhead 28 or be passed through a bore in bulkhead 28 and a threaded nut secured thereon forward of the bulkhead.

Figure 3:
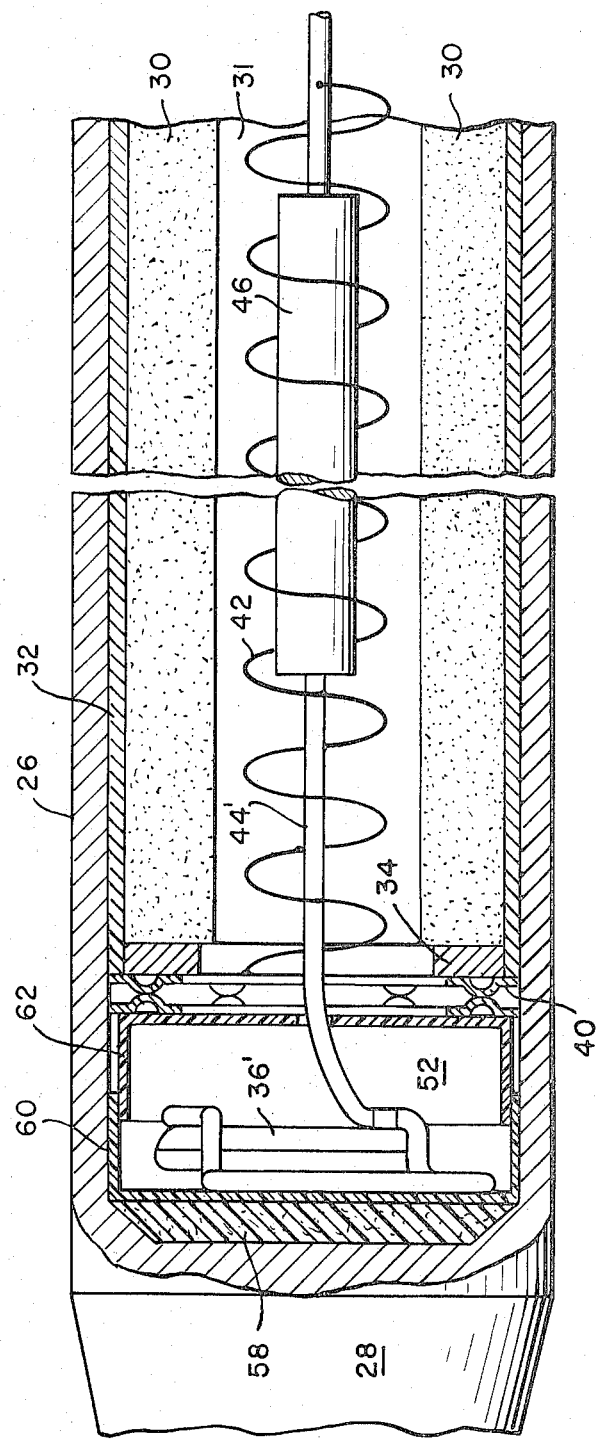
FIG. 3 is a view similar to FIG. 2 showing another embodiment of the invention.

FIG. 3 shows another embodiment of the invention which is readily adaptable to a number of existing rocket designs. The rocket motor casing 26, solid propellant grain cartridge 30, peripheral inhibitor 32, end inhibitor 34 and spacer 40 are essentially the same as described for the embodiment shown in FIGS. 1 and 2. Abutting motor casing bulkhead 28 is an insulation and vibration dampening or vibradamp pad 58 which may be fabricated from any suitable material, such as resin impregnated fiberglass. Positioned against pad 58 is the curved end of resonator rod 44', bent to provide a flat plane abuttable against pad 58 and with aft-turned extensions to receive and support igniter 36'. Both igniter 36' and rod 44' are known and used in the art.

An expansion space or volume 52 is provided forwardly of spacer 40 to accomodate grain thermal expansion. To protect the inner surface of casing 26 surrounding space 52, a pair of relatively shallow, cup-like liner sleeves 60 of suitable material, such as plastic, are positioned aft of vibradamp pad 58 and forward of spacer 40 with the open ends of the sleeves opposing each other and the aft cup sleeve positioned within the forward cup sleeve. The aft-positioned sleeve has a central peroforation for passage there through of rod 44' and spring 42. The depth of each liner sleeve 60 is determined by the maximum anticipated expansion of grain 28, i.e., the minimum remaining expansion space 52, in which position the sides of the aft positioned cup are entirely enclosed by the forwardly positioned cup.

A small diameter, tension spring 42 is suitably attached at the forward end to spacer 40 and at the aft end to rod 44 at a point aft of salt compound coating 46. In this respect, the orientation and cooperative relationship among spacer 40, spring 42 and rod 44 with coating 46 are identical to that described for the embodiment of FIGS. 1 and 2. The assembly of the immobilizer and resonant suppression system embodiment of FIG. 3 is also similar to that for FIGS. 1 and 2. Vibradamp pad 58 is positioned within casing 26 against bulk head 28. Igniter 36' is then positioned within the bent portion of resonance rod 44' and the forward cup sleeve 60 is placed over the igniter. Aft cup sleeve 62 is then placed over rod 44' and inserted within cup 60. Spacer 40 is then positioned over rod 44' against sleeve 62 with spring 42 next placed over the rod and its free ends attached. To insure that cup sleeve 62 moves as the grain expands and contracts, it is adhesively secured to the spacer and reciprocates therewith. The resonant rod-immobilizing spring assembly is then inserted within grain perforation 31 and the grain cartridge 30 in turn being inserted within the rocket motor casing. Assembly of the nozzle 16, the warhead and the loading of the rocket are identical to that set forth hereinabove and need not be repeated here.

Dimensions, material selections, fabrication techniques and applications of the instant invention as discussed hereinabove are by way of example only.

Obviously, numerous modifications and variations of the present invention are possible in light of the above teachings. Elastomeric materials which may result in lower immobilizing forces at high temperatures due to the temperature dependence of the elastic modulus of such materials can be used in place of the tension spring. It is therefore to be understood that within the scope of the apended claims the invention may be practice otherwise than as specifically described herein.

What is claimed as new and desired to be secured by letters Patent of the United States is:

1. An improved rocket motor comprising, in combination:
   a motor casing having one end enclosed;
   a solid propellant grain with a central bore disposed within said casing;
   first support means including a rod disposed adjacent the enclosed end of said casing and extending into said central bore;
   second support means including an annular spacer disposed adjacent one end of said propellant grain; and
   elastic means including a spring with ends attached to said rod and said second support means whereby said spring is placed in tension to exert an immobilizing force on said propellant grain.

2. The rocket motor of claim 1 wherein said spacer is centrally perforated, said rod extends into the propellant grain bore through the central perforation of said spacer, the end of said spring being attached to the aft portion of said rod and said spacer being reciprocally movable.

3. The rocket motor of claim 4 further comprising collapsible means disposed between said spacer and the enclosed end of said motor casing adapted to enclose substantially the volume between said spacer and said enclosed end.

4. In a rocket motor having a propellant casing enclosed at one end and a solid propellant grain with a central bore, a propellant grain immobilizing and resonance suppression system comprising:
   a first support means including a rod disposed adjacent the enclosed end of the casing and extending into the propellant grain bore;
   a second support means disposed adjacent and end of the propellant grain; and
   elastic means including a spring with ends attached to said rod and said second support means to apply an immobilizing force on the propellant grain.

5. The system of claim 4 wherein said second support means comprises a pair of annular discs disposed adjacent the forward end of the propellant grain and reciprocally movable.

6. The system of claim 5 wherein said discs are perforated, said rod extends into the propellant grain bore through said perforated discs and said spring is attached at one end to the aft portion of said rod and at the other end to said discs whereby when said discs move reciprocally said spring is adapted to extend and contract.

7. The system of claim 6 further comprising collapsible means disposed between said perforated discs and said enclosed end of the casing.

8. The system of claim 7 wherein said collapsible means comprises sleeve means having pleated side walls.

9. The system of claim 7 wherein said collapsible means comprises a pair of concentric, cup shaped sleeves with the open ends opposing each other and with one of said sleeves reciprocally movable within the other.

10. The system of claim 9 further comprising:
a circular disc positionable adjacent the closed end of said casing;
an elongated igniter, one end attached to said disc and the other end attached to said rod; and
said spring being disposed encircling said igniter and said rod.

11. The system of claim 10 wherein a portion of said rod is coated with a combustion stabilizing compound and said spring is attached to said rod aft of said compound coating.

12. The system of claim 9 wherein said rod comprises an arcuately bent, recessed forward portion positionable adjacent said enclosed end of said casing.

13. The system of claim 12 further comprising an igniter adapted to be positioned within said recessed portion of said rod.

14. The system of claim 13 wherein a portion of said rod is coated with a combustion stabilizing compound and said spring is attached aft of said compound coating.

* * * * *